June 21, 1927.

F. CÁRDENAS

WATER PUMP

Filed June 16, 1926

1,632,948

INVENTOR
BY Francisco Cárdenas
ATTORNEY

Patented June 21, 1927.

1,632,948

UNITED STATES PATENT OFFICE.

FRANCISCO CÁRDENAS, OF PIEDRAS NEGRAS, MEXICO.

WATER PUMP.

Application filed June 16, 1926. Serial No. 116,374.

This invention relates generally to pumps used for pumping water and the like, the invention having more particular reference to a novel type of pump.

The invention has for an object the provision of an improved pump of simple construction and novel arrangement of parts.

For further comprehension of the invention, and of the objects and advantages thereof, reference will be had to the following description and accompanying drawing, and to the appended claims in which the various novel features of the invention are more particularly set forth.

Fig. 1, of the drawing, is a top plan view of my improved pump, partly in section so as to expose certain working parts.

Figures 1, 2:
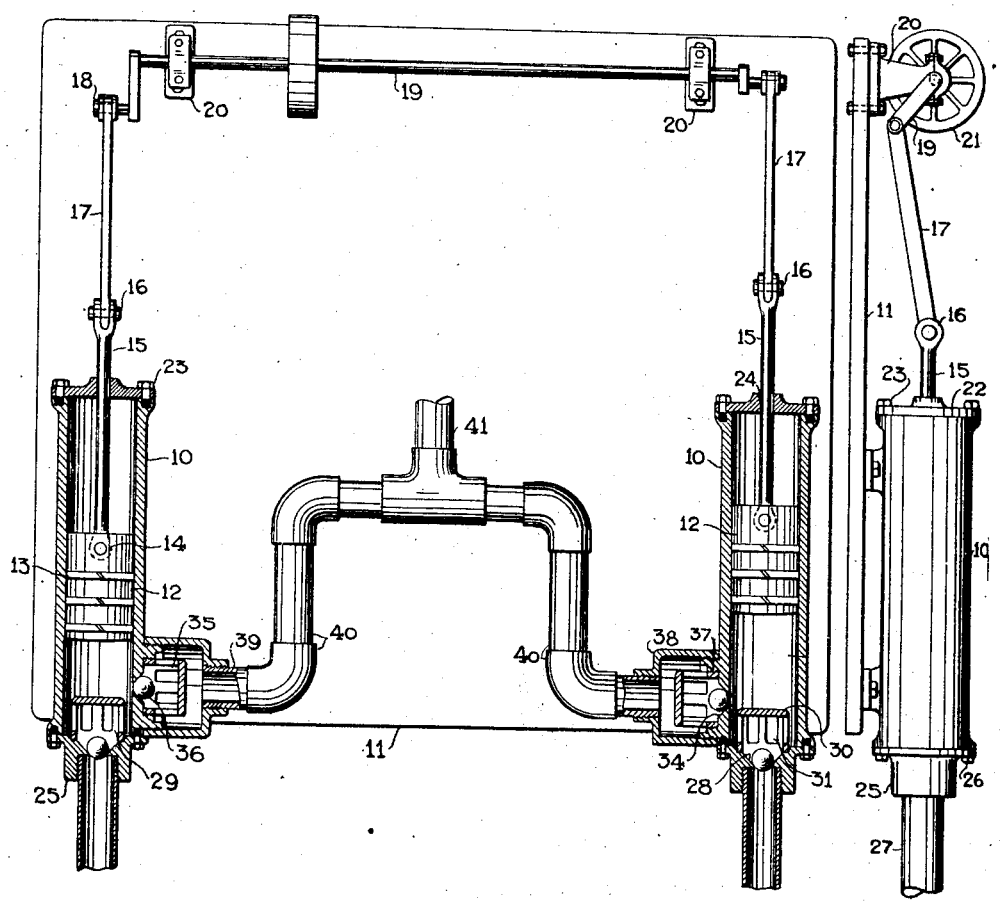
Fig. 2, is a side elevational view thereof.
Figure 3:
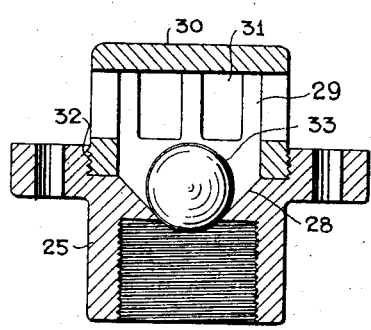
Fig. 3, is a central sectional view of the cylinder head as used in connection with my improved pump showing the valve cage attached thereto.
Figure 4:
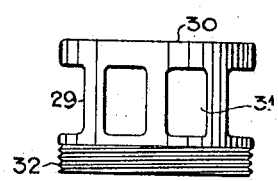
Fig. 4, is a side elevational detail view of the valve cage.

As here embodied my improved pump embodies cylinders 10 mounted on a suitable base 11. The piston 12, provided with piston rings 13, a slidable fit in the cylinder 10, and having pivotally attached thereto, as at 14, by a piston pin, a piston rod 15, pivotally attached as at 16, by a pin, a connecting rod 17, pivotally attached, as at 18, to the crankshaft 19. The crankshaft 19, is rotatively mounted in suitable bearings 20, attached to the base 11. The pulley 21, is rigidly attached to the crankshaft 19.

The cylinder 10 is provided with a cap 22, removably attached thereto, as at 23, by bolts, studs, or the like, and is provided with an axial aperture 24, to slidably accommodate the piston 15.

The cylinder 10 is provided with a cylinder head 25, removably attached thereto, as at 26, by bolts, studs or the like, and has suitably attached thereto an intake pipe 27, intercommunicative with the inner chamber, of the cylinder 10, and is also provided with a valve seat 28, tapered, or cone shaped, suitably formed therein.

The valve cage 29 is of hollow cylindrical constitution, provided with apertures 31, and having a closed end 30. The valve cage 29 is threadedly attached, as at 32, to the cylinder head 25, and is located or positioned in the inner chamber of the said cylinder 10, so as to contain the ball 33, which is of suitable diameter to close the valve seat 28.

The above described construction being such as will permit the piston 12 of my improved pump when operated by a belt, not shown, in the accompanying drawing, extended over the pulley 21 and over a second pulley attached to any suitable prime-mover, not shown in the accompanying drawing, to draw in or suck in water, or any liquid, through the valve seat 28, and the apertures 31 of the valve cage 29, into the inner chamber of the cylinder 10, on the inward stroke of the said piston 12, and which will permit the ball 33, to engage with or cover the valve seat 28, on the downward, or return stroke of the piston 12, so as to prevent the heretofore mentioned water, or liquid from entering the intake pipe 27.

The cylinder 10 is provided with a valve seat 34, tapered, or cone shaped, suitably formed therein, and located, or positioned adjacent to the cylinder head 25. The valve cage 35, of identical construction to the above mentioned valve cage 29, is similarly attached to the cylinder 10, and is located or positioned outside the cylinder 10, so as to contain the ball 36, which is of suitable diameter to close the valve seat 34.

The cylinder 10, has threadedly attached thereto, as at 37, a suitable connection 38, located or positioned over the valve cage 35, and adapted to suitably receive an outlet pipe 39, which may be suitably connected, as at 40, by any desired fittings, to a discharge pipe 41.

The later described construction being such as will permit the piston 12 of my improved pump when operated, as herein before set forth, to close the valve seat 34 by the ball 36 engaging with or covering the valve seat 34, on the said inward stroke of the piston 12, and which will permit the ball 33 to disengage with, or uncover the valve seat 34, on the outward, or return stroke of the piston 12, so as to allow the heretofore mentioned water, drawn in or sucked into the inner chamber of the said cylinder 10, to be forced through, or discharged through the valve seat 34, the apertures 31, of the valve cage 35, the connection 38, and through the outlet pipe 39, and the discharge pipe 41.

It being understood that the discharge pipe 41 may be of any desired length, such as may be required for irrigating purposes, on farms, or the like. It being understood that I do not necessarily limit my improved device to this particular purpose. It being further understood that my improved device may be used to pump any and all classes of liquids, including acids, as my improved device may be constructed of suitable metal to withstand acids, or the like.

While I have above described the preferred form, construction, and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new, and desire to protect by Letters Patent of the United States is as follows:—

1. In a pump of the class described, a cylinder having a circumferential flange on the bottom end thereof provided with spaced apertures, a valve member comprising a valve seat, a circumferential flange on said valve member having spaced apertures therein adapted to register with the spaced apertures of said cylinder flange for attaching said valve member to the bottom of said cylinder, said valve member being provided with upper and lower screw threaded openings one on each side of said valve seat, a fluid supply pipe screw threaded in said lower opening, a valve cage screw threaded in said lower opening, and a ball disposed in said valve cage adapted to rest upon said valve seat for closing the opening therein.

2. In a pump of the class described, a cylinder having substantially vertical sides, a cylindrical flange mounted on the side of said cylinder, internal and external threads on the inner and outer cylindrical surfaces respectively of said flange, said cylinder being provided with an opening having tapered sides adapted to provide a valve seat, a valve cage screw threaded on the internal threads of said flange, a ball confined in said cage adapted to recline on said valve seat and to close the opening in said cylinder, a cylindrical housing screw threaded on the external threads of said flange and disposed over said valve casing, said housing being provided with a screw threaded opening, and a discharge pipe screw threaded in said opening.

3. In a pump of the class described, a cylinder having a circumferential flange on the bottom end thereof provided with spaced apertures, a valve member comprising a valve seat, a circumferential flange on said valve member having spaced apertures therein adapted to register with the spaced apertures of said cylinder flange for attaching said valve member to the bottom of said cylinder, said valve member being provided with upper and lower screw threaded openings one on each side of said valve seat, a fluid supply pipe screw threaded in said lower opening, a valve cage screw threaded in said lower opening, a ball disposed in said valve cage adapted to rest upon said valve seat for closing the opening therein, a cylindrical flange mounted on the side of said cylinder, internal and external threads on the inner and outer cylindrical surfaces respectively of said flange, said cylinder being provided with an opening having tapered sides adapted to provide a valve seat, a valve cage screw threaded on the internal threads of said flange, a ball confined in said cage adapted to recline on said valve seat and to close the opening in said cylinder, a cylindrical housing screw threaded on the external threads of said flange and disposed over said valve casing, said housing being provided with a screw threaded opening, and a discharge pipe screw threaded in said opening.

4. A valve adapted to be secured to the lower open end of a cylinder comprising a lower member having a valve seat therein, and a screw threaded opening therebelow, a flange disposed around the upper portion of said lower member having spaced apertures therein adapted for attachment to the open end of said cylinder, a valve cage screw threaded on said lower member above the valve seat therein, and a ball disposed in said cage adapted to recline on said valve seat for closing the opening therein.

In testimony whereof I have affixed my signature.

FRANCISCO CÁRDENAS.